Figure 1:
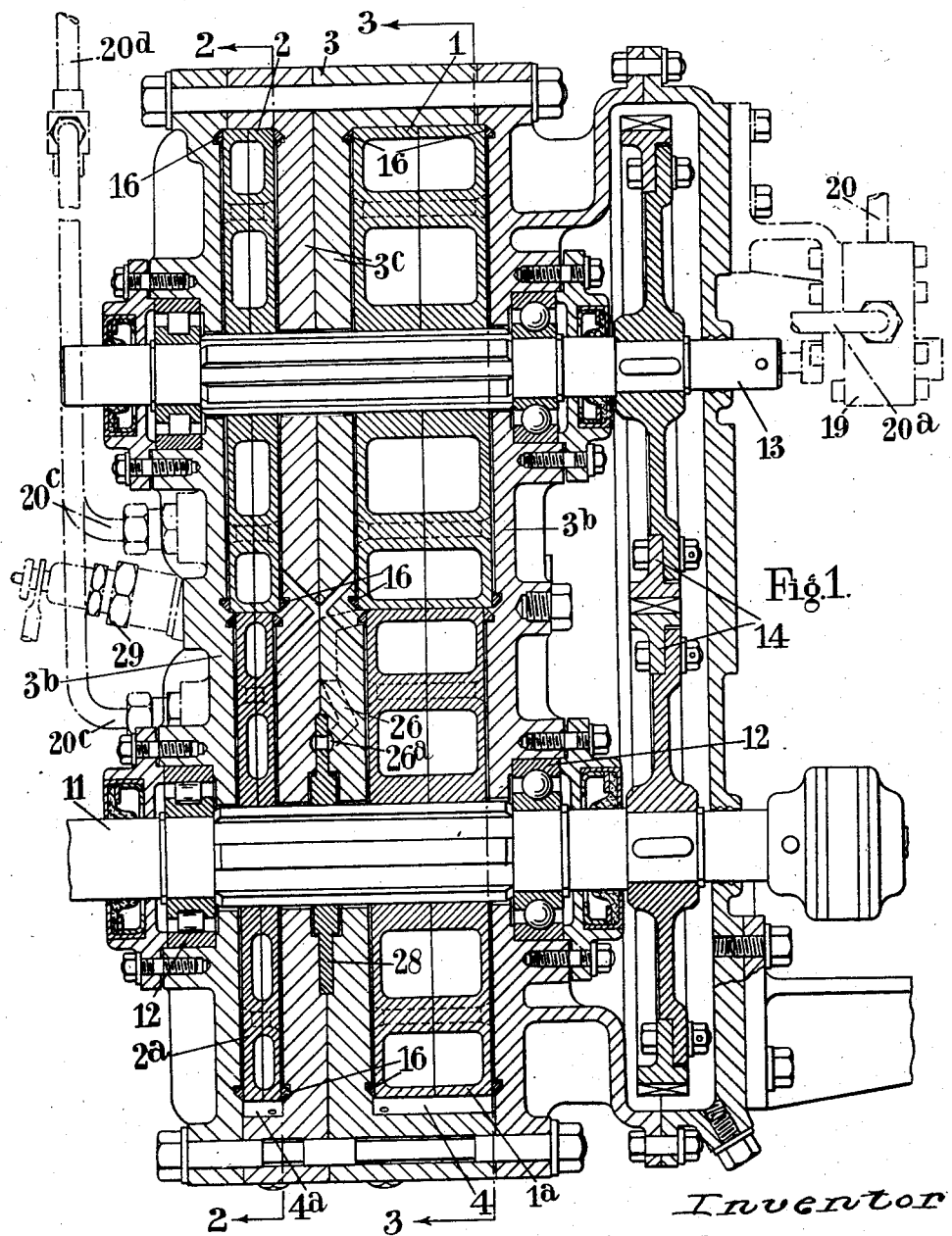

July 8, 1947.  J. FARESO  2,423,763
ROTARY INTERNAL-COMBUSTION ENGINE OF THE ROTATING ABUTMENT TYPE
Filed Jan. 12, 1944  11 Sheets-Sheet 2

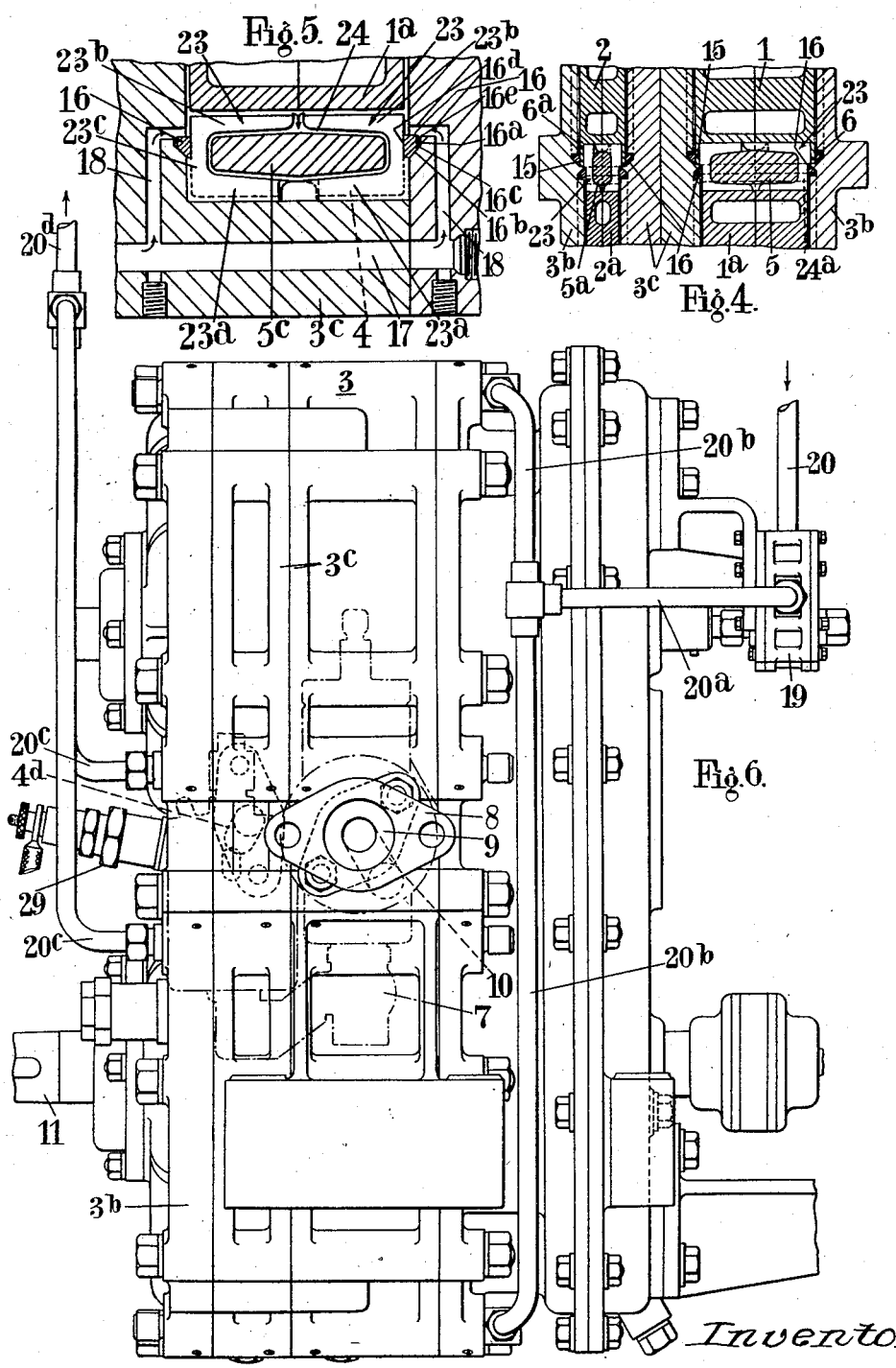

July 8, 1947. J. FARESO 2,423,763
ROTARY INTERNAL-COMBUSTION ENGINE OF THE ROTATING ABUTMENT TYPE
Filed Jan. 12, 1944 11 Sheets-Sheet 7

Inventor
J. Fareso

July 8, 1947.  J. FARESO  2,423,763
ROTARY INTERNAL-COMBUSTION ENGINE OF THE ROTATING ABUTMENT TYPE
Filed Jan. 12, 1944  11 Sheets-Sheet 9

Inventor
J. Fareso
By Glascock Downing Seibel
Attys

July 8, 1947. J. FARESO 2,423,763
ROTARY INTERNAL-COMBUSTION ENGINE OF THE ROTATING ABUTMENT TYPE
Filed Jan. 12, 1944 11 Sheets-Sheet 11

Inventor
J. Fareso
By Mascot Downing Sable Attys

Patented July 8, 1947

2,423,763

UNITED STATES PATENT OFFICE 2,423,763

ROTARY INTERNAL-COMBUSTION ENGINE OF THE ROTATING ABUTMENT TYPE

John Fareso, Hornchurch, England, assignor to George Bernard Morgan, London, England Application January 12, 1944, Serial No. 518,023
In Great Britain October 29, 1942

1 Claim. (Cl. 123—13)

This invention relates to rotary engines (which may function as an internal combustion or steam engine or simply as a pump or compressor) of the kind which employ a pair of co-operating rotors operating in a casing and consisting of one rotor having a piston element projecting radially therefrom to sweep out an annular chamber formed around the outer periphery of this rotor and constituting the working chamber or cylinder space, and a second abutment rotor, a portion of which extends into the said annular chamber so that the outer periphery of this rotor may rotate in sealing relationship with respect to the outer periphery of the piston rotor and which second rotor is provided around its outer periphery with a recess into which the piston can pass during rotation of the rotors.

The invention has for its object to provide an efficient rotary engine, pump or compressor, which is satisfactorily sealed against leakage without the necessity of using spring loading means and their attendant disadvantages such as are normally used for this purpose and which, in practice, are open to objection.

The invention also has for object to provide a satisfactory and efficient rotary engine which is capable of functioning as an internal combustion engine.

The invention consists in a rotary engine, pump or compressor of the kind specified wherein the said recess is formed by a pocket in the abutment rotor which is closed on its sides and open only to the periphery of its rotor, whereby the piston becomes enclosed within the pocket in its rotation past the same, and wherein sealing elements provided in association with the rotors are subjected to the action of fluid pressure to maintain them in the required sealing engagement with the fixed casing of the engine, pump or compressor.

The use of the above two features, in combination with each other, namely, the side enclosed recess and the fluid pressure sealing medium, provide a satisfactory arrangement for maintaining the requisite seal at low and elevated speeds of rotation of the rotors.

The invention also consists in a rotary engine, pump or compressor of the kind specified wherein the engine, pump or compressor comprises a zone of fluid sealing pressure which includes sealing means on the piston and provides that the fluid pressure is operative on such sealing means to seal the piston and constitute also a cooling or heat dissipating medium. The pressure medium employed is conveniently lubricating oil, which is circulated through suitable ducts and passages in the engine casing and serves also to lubricate the engine parts.

The invention also consists in a rotary engine of the kind specified wherein the rotary engine is adapted for use as an internal combustion engine and comprises, in combination, two co-operating pairs of rotors arranged side-by-side in a casing on common driving and driven shafts and constituting, on one side, a compressor for the combustible mixture and, on the other side, an explosion chamber, a partition wall in the casing separating the two co-operating pairs of rotors and having transfer ducts therein, consisting of a duct open to the annular chamber of the compressor rotor and terminating within the said partition and another duct open to the annular chamber of the firing rotor and terminating also within the partition and a rotary member mounted on the driving shaft to rotate in said partition and having an arcuate slot arranged, during a portion of the rotation of the said member, to coincide with the inner ends of the said two ducts within the partition, whereby during that time the two ducts are placed in communication with each other and the explosive mixture compressed on the one side can be admitted to the firing chamber on the other side, the angular setting of the pistons of the compressor and firing rotors and also the angular setting of the said arcuate slot in relation thereto being such as will provide for a transfer of the explosive mixture from the compressor space to the firing space at the appropriate time during the rotation of the two rotors and for the firing of the compressed charge within the firing chamber at a time when the intercommunication afforded by the said ducts has been temporarily cut off by the said disc, which latter functions as a distributor for the explosive mixture.

Figure 2:
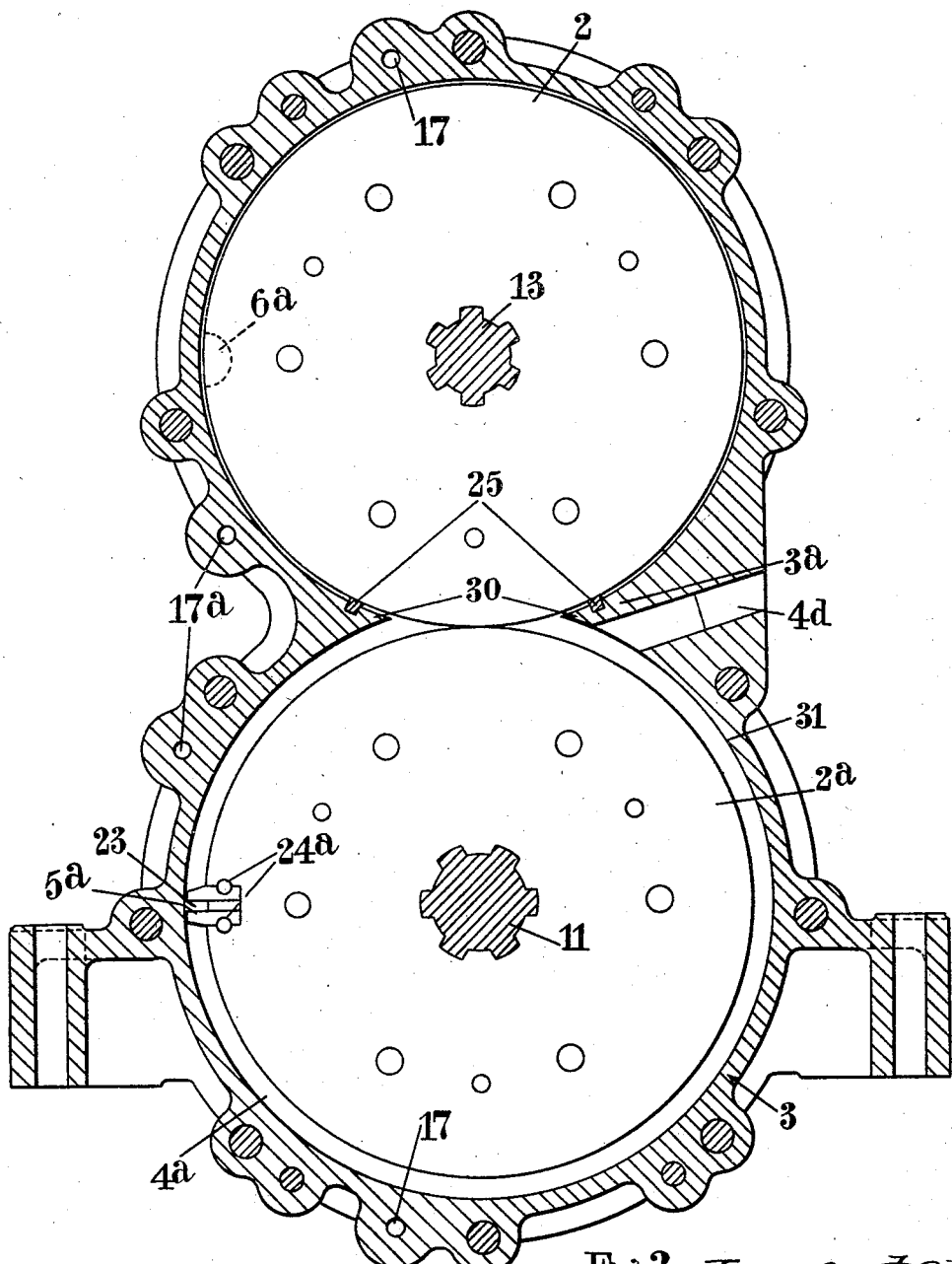
Figure 3:
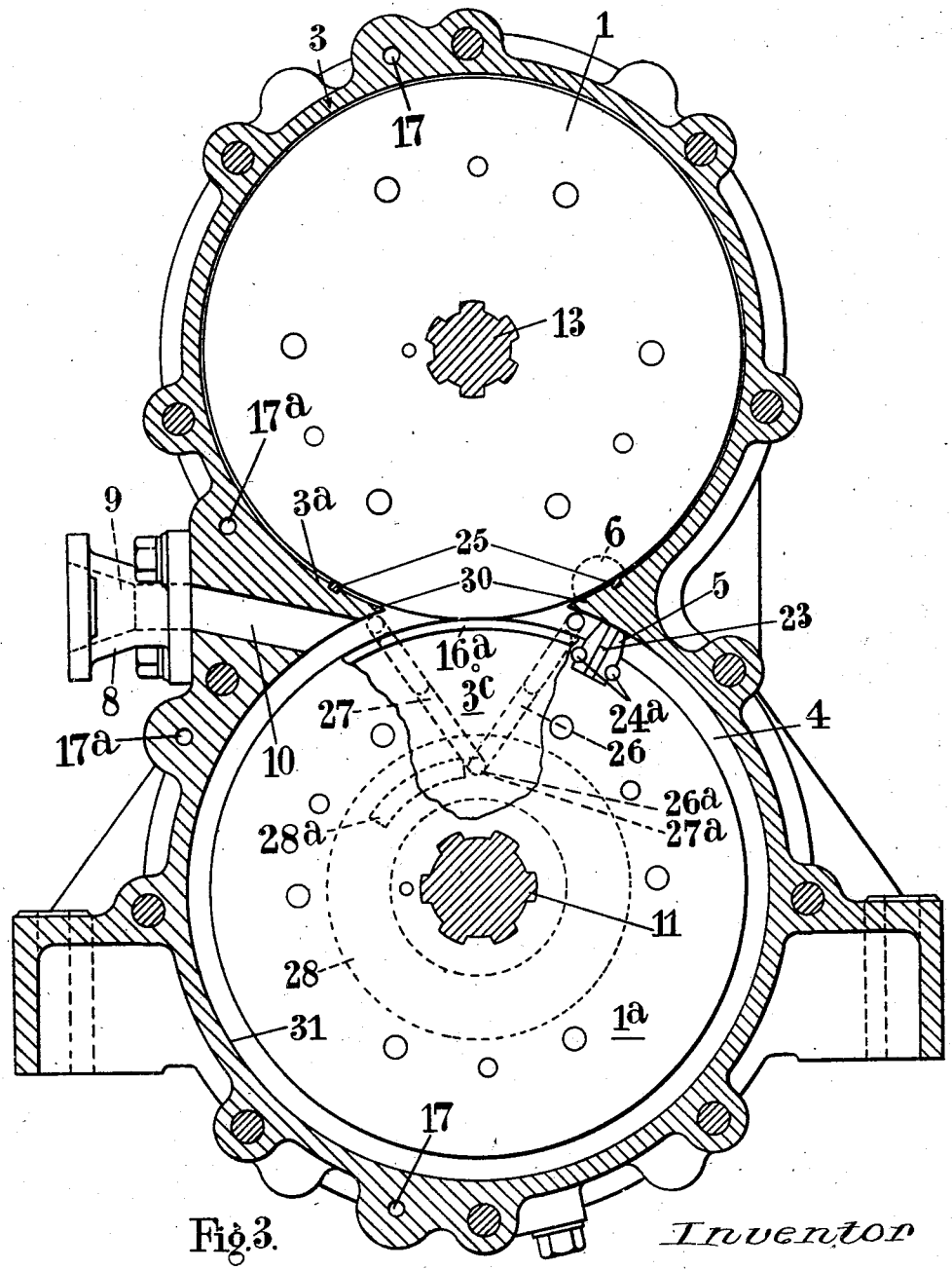
Figure 7:
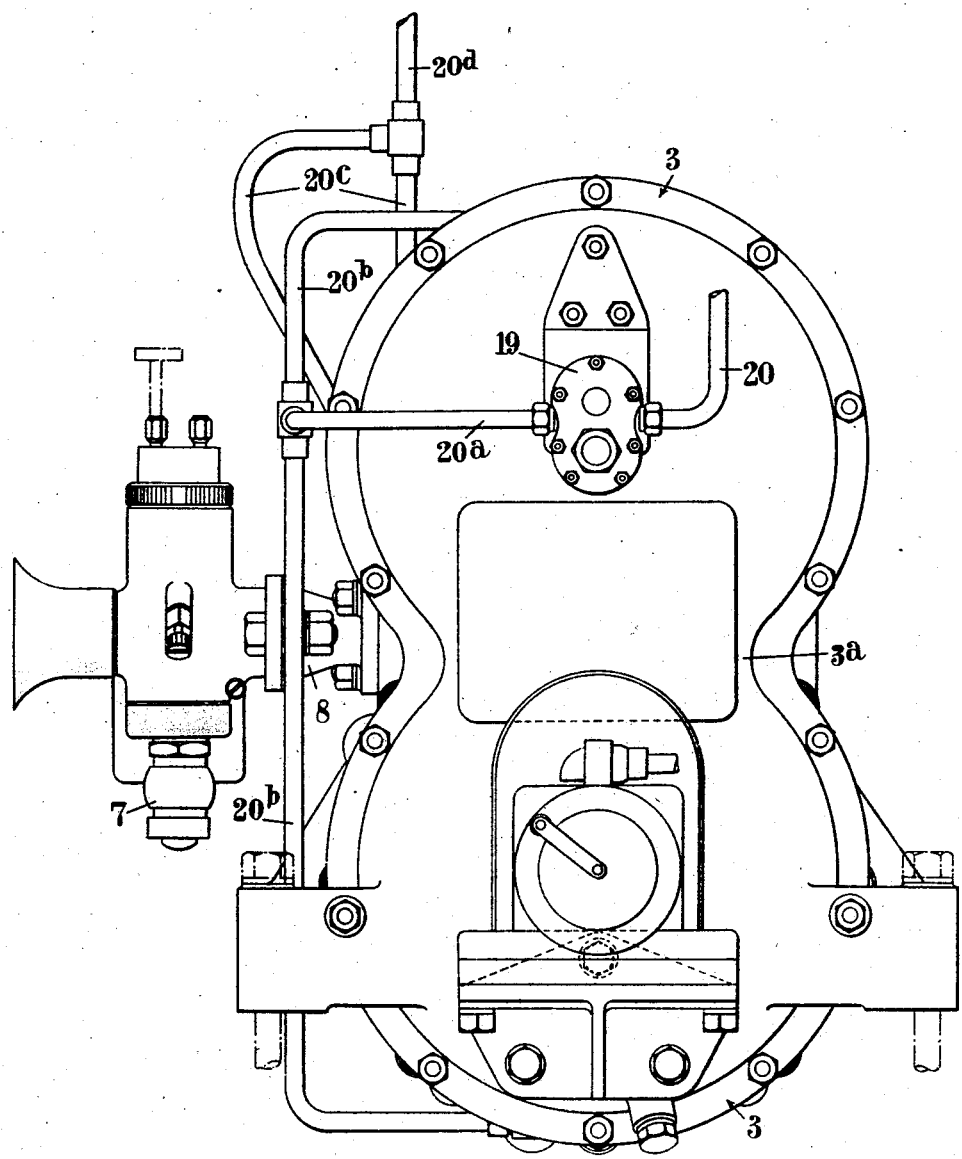
Figure 8:
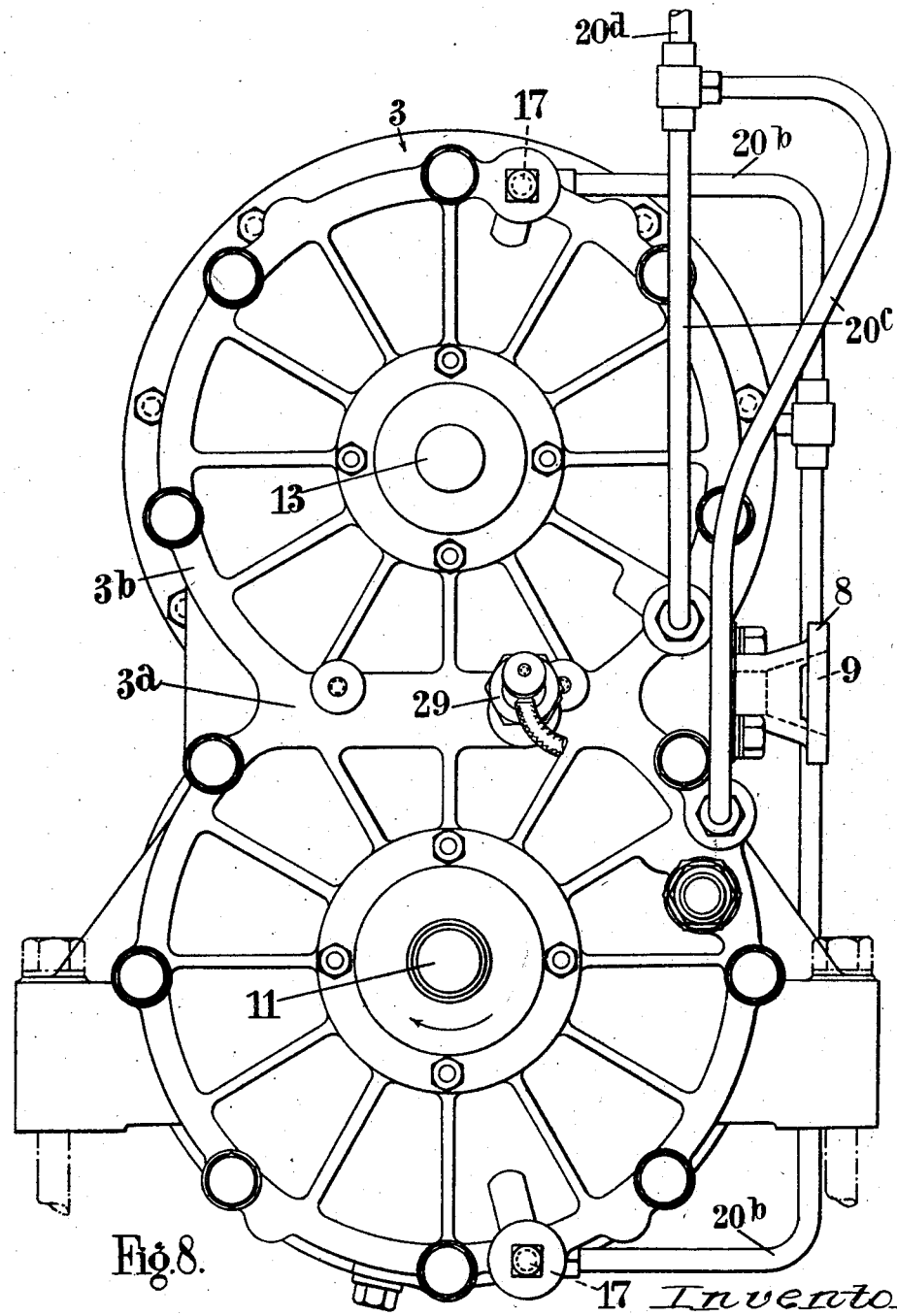
Figure 9:
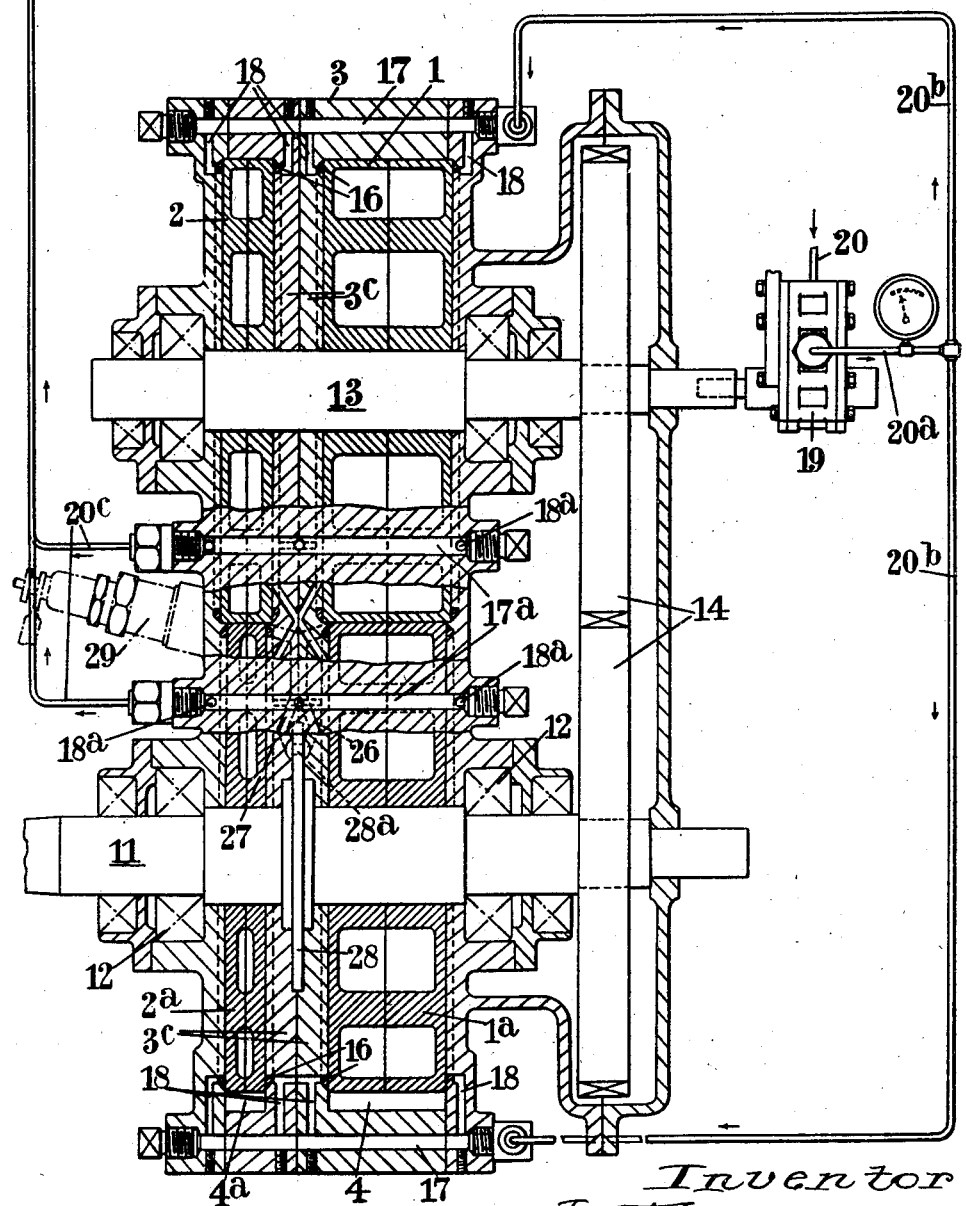
Figure 10:
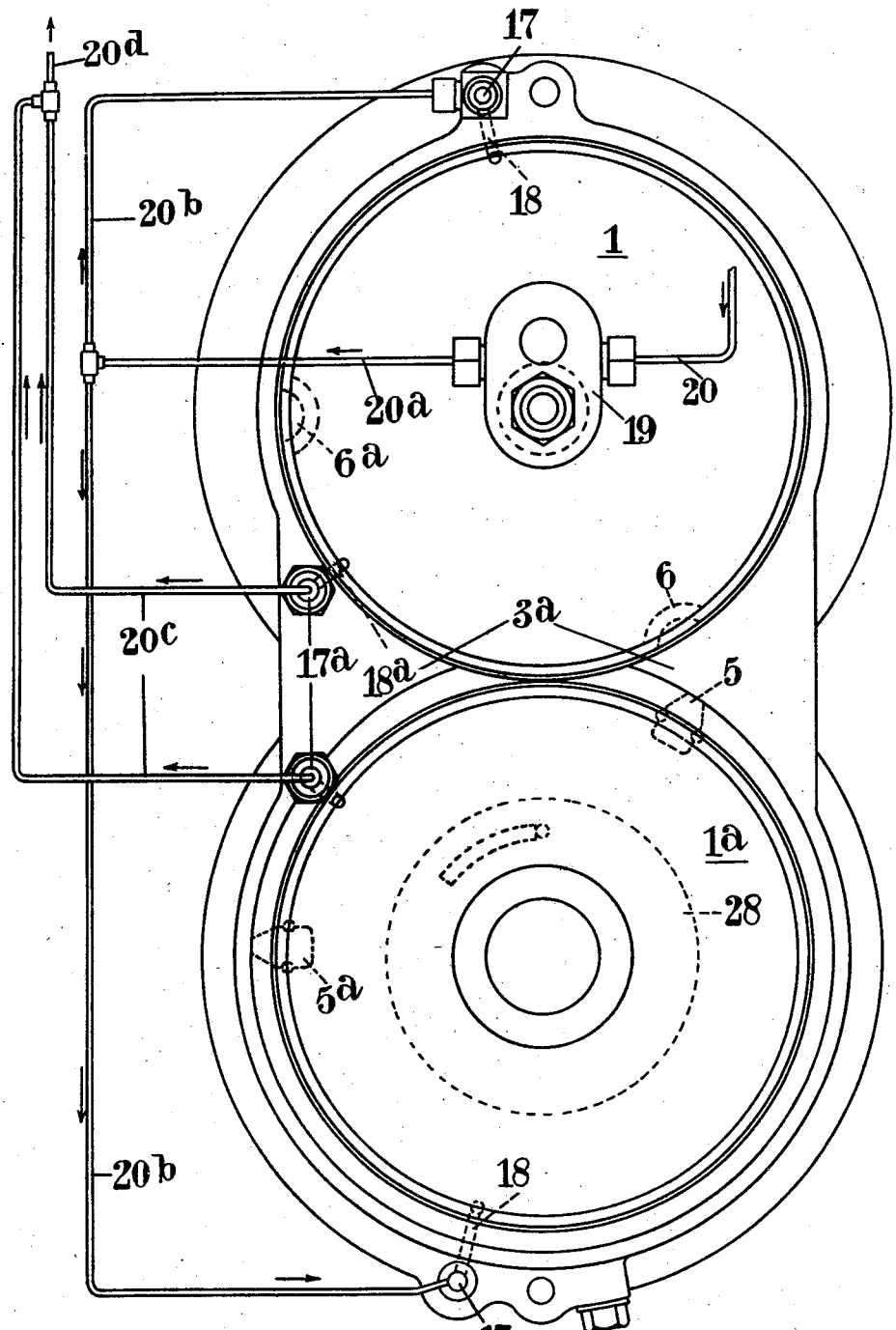
Figure 11:
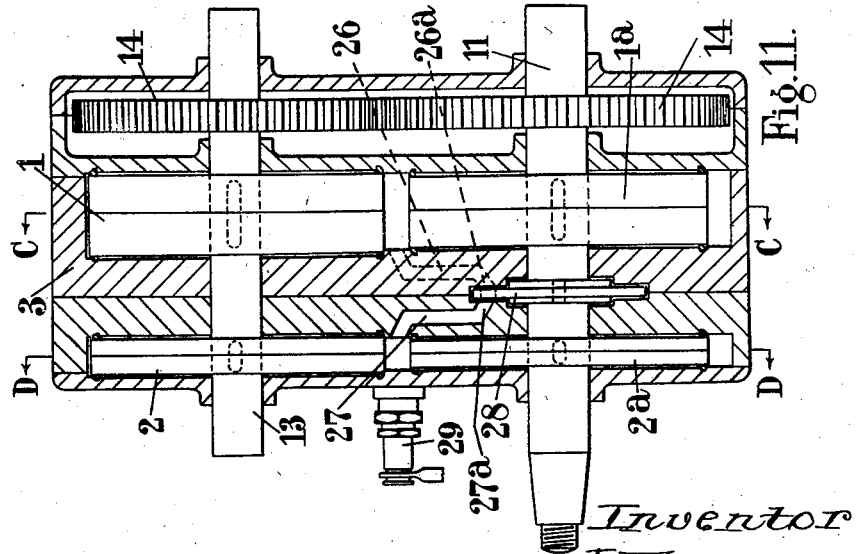

In the accompanying drawings:

Figure 1 is a vertical sectional view of a rotary engine in accordance with the invention adapted to function as an internal combustion engine, Figure 2 is a cross-sectional view on the line 2—2 of Figure 1, Figure 3 is a cross-sectional view on the line 3—3 of Figure 1, Figure 4 is a fragmentary vertical sectional view illustrating the two pistons in engagement with their respective pockets in the abutment rotors, Figure 5 is an enlarged fragmentary sectional view showing the mode of sealing the pistons of the piston rotors, the clearance spaces between the rotor piston and its sealing plates being shown exaggerated for the sake of clearness of illustration, Figure 6 is a side elevational view, with the carburettor removed, of a rotary internal combustion engine as illustrated in Figures 1 to 5, Figure 7 is an end elevational view, with the carburettor in position, looking on the right-hand side of Figure 6, Figure 8 is an end elevational view, with the carburettor removed, looking on the left-hand side of Figure 6, Figure 9 is a part vertical sectional and part diagrammatic view showing the fluid pressure circulatory system employed for maintaining the desired sealing pressure, Figure 10 is a diagrammatic view of the fluid pressure circulatory system as viewed upon one end of the rotary engine, and Figures 11 to 16 are generally diagrammatic views illustrating the rotary internal combustion engine in its various stages of operation, Figure 11 representing the engine in end view and Figures 12 to 16 representing the engine in side view, the left half of each of these latter figures resembling cross sections on the line C—C of Figure 11 and the right-hand half of the figures resembling cross sections on the line D—D of Figure 11.

In carrying the invention into effect in one convenient manner as illustrated in the drawings and referring firstly to Figures 1 to 3 in particular a rotary internal combustion engine is provided which comprises a pair of co-operating rotors 1, 1a, mounted for rotation within cylindrical spaces in a casing 3 such that an annular chamber 4 surrounds the outer periphery of the rotor 1a and a portion of the outer periphery of the other rotor 1, during the rotation of the latter, enters into this annular chamber so as to rotate in sealing relationship with the outer periphery of its companion rotor 1, whereby the annular chamber 4 may be sealed-off and function as a working chamber in the manner to be described.

Projecting radially from the rotor 1a so as to sweep out the annular chamber 4 there is a piston 5 which once during each complete rotation of the rotor 1a enters into engagement with a radial pocket 6 in the outer periphery of the companion rotor so that the piston may pass by this rotor as the two rotors are rotated in opposite directions.

The two rotors 1, 1a co-operate to form a compressor in which the combustible mixture is initially compressed and this pair of rotors is mounted in the casing 3 alongside another pair of co-operating rotors 2, 2a which are conveniently of the same diameter as the adjacent compressor rotors but are smaller in width compared therewith so that an annular chamber 4a formed about the outer periphery of the rotor 2a is of smaller volume than the annular working chamber 4 of the compressor and serves to constitute the engine firing or explosion chamber into which charges of the explosive mixture compressed in the annular chamber 4 of the compressor are delivered from the compressor and fired at the appropriate time.

The combustible mixture is delivered to the annular chamber 4 of the compressor from a carburettor 7 (Figure 7) fitted to an injector box 8 secured to the outer peripheral wall of the engine casing on one side of the waist 3a thereof and having its hollow throat 9 in communication with a duct 10 in the said waist 3a, this duct opening at its inner end into the annular chamber 4 of the compressor.

The rotor 2, like its adjacent counterpart 1, is provided with a radial pocket 6a and its companion rotor 2a is also provided with a radially projecting piston 5a which enters into the pocket 6a once during each complete rotation of the two rotors 2 and 2a and thereby permits the piston 5a to pass by the rotor 2.

The two adjacent piston rotors 1a and 2a are fixed, as by splines and keys, upon a common and driving cross shaft 11 mounted in suitable bearings 12 in the sides of the casing and the two adjacent abutment rotors 1 and 2 are also fixed upon another common and driven cross shaft 13. The two shafts are coupled together outside the casing by suitable gearing 14. Each abutment rotor, as stated, is formed with a pocket open to the outer periphery of its rotor so that the corresponding piston can enter its pocket. Each such pocket is closed on its sides by the side walls 15 (Figure 4) of the rotor in which it is contained and these walls therefore are in the form of continuous or complete discs with which sealing rings 16 (Figures 1 and 4), accommodated in annular recesses 16a in the adjacent inside surfaces of the inner and outer side walls 3b, 3c respectively of the fixed casing, engage to maintain a fluid-tight seal, whereby the gases are confined within the working chambers formed around the piston rotors and leakage of the gases, when the pistons are moving into and out of the pockets in their abutment rotors, is prevented.

Conveniently, and as is clearly shown in Figure 4, each pocket or abutment rotor 1 and 2 is somewhat wider than its companion piston rotor 1a and 2a so that the pistons, which extend the full width of their rotors and consequently of the annular chambers in which they operate, may pass into their respective pockets and be enclosed on their opposite side surfaces by the outer side portions of the abutment rotors which extend laterally beyond the sides of the piston rotors. Accordingly, the pairs of sealing rings 16 associated with the abutment rotors 1 and 2 are disposed in planes laterally offset or displaced outwardly somewhat with respect to the planes in which the pairs of sealing rings 16 associated with the piston rotors 1a and 2a are located.

There is one sealing ring 16 provided in association with each side wall of each rotor and each sealing ring is in the form of a narrow split spring ring of a general outside diameter approximating the diameter of its respective rotor and formed with its outer peripheral edge 16b bevelled and in engagement with a correspondingly shaped surface 16c of the annular recess 16a in the fixed casing, which latter, on the interior surface of each rotor, includes the internal wall or partition 3c separating the compressor and firing rotors so that there is one cooperating pair of rotors on one side of the partition and another pair on the opposite side. This central wall or partition is shown as being formed by two adjacent plates 3c.

Each sealing ring is conveniently formed with a lap-over joint at the split. On one side the ring has a flat surface 16d which contacts with the outer peripheral edge portion of the circular side face of a rotor and to prevent the ring from being rotated in consequence of the rotation of the rotor with which it is associated the ring is formed, in the portion thereof diametrically opposite the slit, with a projection directed radially inwards and engaged in a corresponding recess in the fixed casing. The outer peripheral edge of each sealing ring, as above stated, is bevelled and the arrangement is such that the largest diameter of the split ring is contained in the side surface thereof which contacts with the outer peripheral edge of a rotor, while the smallest outside diameter of the split ring is contained in a narrower flat side surface 16e of the ring which is parallel with the aforesaid flat side surface 16d and contacts with the corresponding side wall of the recess 16a in the fixed casing in which the ring is accommodated. Each sealing ring has a clearance fit in its annular recess 16a in the engine casing.

Each sealing ring at the overlap joint is also formed with a projection which extends radially inwards and engages in a correspondingly shaped recess in the fixed casing 3 so that this engagement and that afforded by the diametrically opposite projection efficiently prevents the ring from rotating.

Additional sealing members consist of sealing members provided upon each rotor piston and sealing members provided in the waist portions 3a of the engine casing to co-operate with the peripheral edge surfaces of the abutment rotors 1 and 2.

The sealing members on each rotor piston are shown in detail in Figure 5 and consist of a pair of channel elements 23 let into channel recesses 24 in each piston so that the side walls 23a and 23b of each channel element extend into the piston interior above and below, respectively, a central solid portion 5c of the piston around which the piston recesses extend to accommodate the sealing members such that the web walls 23a and 23b of the channel elements extend transversely in opposite directions into and around the piston, the outer side walls 23a of the sealing members being formed to overlap one another at the central portion of the outside transverse wall of the piston. Each piston is conveniently separately formed and keyed into position in a radial recess in the periphery of its rotor by transverse keys 24a, seen in Figures 2 and 3 and the recesses or channels are dimensioned such that the sealing members have a clearance fit therein, which is grossly exaggerated in Figure 5 for the purpose of illustration.

The sealing members provided in the waist part of the engine casing are in the form of elongated strips 25 which are let into recesses in the engine casing so as to be capable of making contact with the peripheral edge surfaces of their respective abutment rotors 1 and 2 on each side of the pockets 6 and 6a when these are in the central position in which the pistons enter into engagement therewith in the rotation of the rotors. These sealing strips also engage in their recesses with a certain amount of clearance.

The individual rings 16 on account of their spring action tend to be urged outwards into sealing engagement, by their bevelled outer peripheral edges 16b, with the adjacent bevelled walls 16c of the recesses in the casing in which they are located but in order to maintain an efficient seal under all operating conditions provision is made whereby the sealing rings are subjected to the action of a pressure liquid, which is conveniently oil, circulated through a system of main ducts 17, 17a and branch ducts 18, 18a in the engine casing and preferably circulated by the operation of a pump 19 geared or connected to the driven shaft of the rotary engine so as to be actuated by the latter. To this end the driven shaft 13 of the rotary engine upon which the abutment rotors are keyed is connected on one side of the engine casing with the oil pump 19 so that the pump is actuated to circulate pressure oil from an oil tank (not shown) and in a closed circuit through a pipe system which includes an inflow pipe 20 leading from the tank to the pump, an outflow pipe 20a from the pump, a pair of branch pipes 20b leading from the outflow pipe 20a to the main ducts 17 in the engine casing, and another pair of branch pipes 20c leading from the other main ducts 17a in the engine casing to a return flow pipe 20d which is connected back to the oil tank and conveniently includes a pressure gauge 21 and a suitable pressure regulating valve 22.

The main ducts 17 in the engine casing extend transversely across the casing adjacent the outer peripheries of the co-operating pairs of rotors and the branch ducts 17a lead therefrom to the interior of each annular recess 16a containing a sealing ring 16 so that the pressure oil may have free contact with the inner periphery of each such ring and may, in addition, flow into the clearance spaces between the piston sealing elements and the engine casing and rotor recesses in which these sealing elements are accommodated. The oil leaves the interior of the engine casing through the branch ducts 17a and the other main transverse ducts 18 provided to extend across one side of the waist portion of the engine casing.

The pump 19 operates during the operation of the engine to maintain a continuous circulation of the oil through the pipe and duct system above described and at a pressure which increases as the speed of rotation of the rotors increases and which is adjustable to permit of the obtaining of a predetermined maximum pressure. This oil pressure acts upon the sealing members to fill the clearances referred to and maintain the members in the desired engagement with their respective portions of the rotary and fixed parts. The sealing elements on the pistons will, by the centrifugal forces generated at high speeds of rotation, tend to be urged radially outwards into sealing contact with the side walls of the annular chambers 4 and 4a in which the pistons rotate. Such movement is permitted within the limits of the working clearances present, which in any case will be taken up by the circulated pressure oil and this serves at the same time to keep the sealing members 23 on each piston in a transversely projected or outward position in which their side walls 23c are maintained in sealing contact with the adjacent side walls of the annular chambers 4 and 4a. Such a flow of the pressure oil, tending to keep the sealing members on the pistons urged outwards into the required sealing engagement, is indicated by the arrows in Figure 5.

The bottoms of the recesses in which the sealing strips 25 are accommodated are also connected with the oil pressure circulator system in order that the strips may be maintained in sealing engagement with their respective rotors by the circulated pressure oil.

The compression chamber 4 comprises in effect two separate chambers which are formed automatically on opposite sides of the piston 5 as the latter rotates and consist of the compression chamber proper, indicated by the reference 4, and the suction chamber 4b into which the combustible mixture is drawn, in the rotation of the compressor rotor, through the duct 10.

The firing or explosion chamber 4a also comprises in effect two separate chambers which are created automatically upon opposite sides of the piston 5a as the latter rotates and consist of the firing or explosion chamber proper, indicated by the reference 4a and the exhaust chamber 4c from which the exhaust gases are discharged through the exhaust duct 4d in the engine casing.

In order to provide for the transfer of the explosive mixture from the compressor chamber 4 to the explosion chamber 4a the internal wall or partition 3c of the engine casing, which separates the two pairs of rotors, is provided with an arrangement of ducts consisting of a duct 26 open to the annular chamber of the compressor rotor and terminating within the partition and another duct 27 open to the annular chamber 4a of the firing rotor and terminating also within the partition wall of the engine casing, which latter is fitted, in a suitable recessed portion thereof, with a rotary plate or disc 28 keyed upon the driving shaft 11 of the engine and having an arcuate slot 28a arranged, during a portion of the rotation of the disc, to coincide with the inner ends 26a and 27a of the said two ducts 26 and 27 whereby during that time the two ducts are placed in communication with each other and the explosive mixture compressed in the compression chamber 4 can be transferred from this chamber into the chamber 4a on the other side. The angular setting of the pistons of the compressor and firing rotors and also the angular setting of the said arcuate slot 28a in relation thereto will be such as will provide for a transfer of the explosive mixture from the compressor space 4 to the firing space 4a at the appropriate moment during the rotation of the rotors and for the firing of the compressed charge within the firing chamber 4a at a time when the inter-communication afforded by said ducts 26 and 27 has been cut off by the action of said disc, which functions as a distributor for the explosive mixture. The firing of the explosive mixture is accomplished by the sparking plug 29.

Figures 11 to 16 (particularly 12 to 16) illustrate the engine in its cycle of operations and for convenience the compression and explosion rotors are shown in Figures 12 to 16 as being disposed plan-wise alongside one another (whereas they are of course disposed edgewise) and the compressor rotors shown on the left of Figures 12 to 16 must be imagined as being a section on the line D—D of Figure 11, while the explosion rotors must be imagined as being a section on the line C—C of Figure 11.

Figure 12:
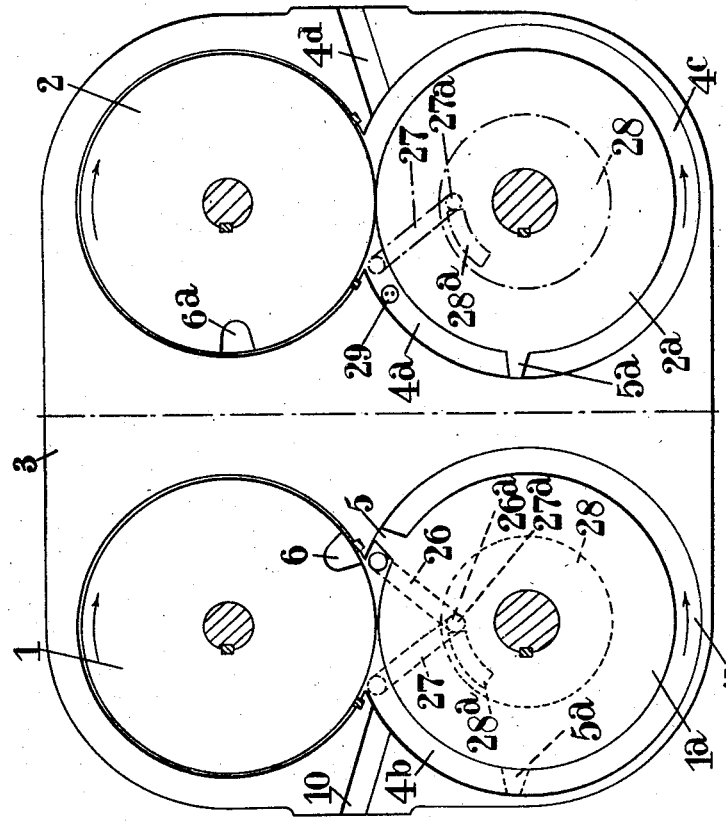

Figure 12 shows the engine in the position in which the arcuate slot 28a in the valve plate 28 is closed and the compressed mixture in the explosion chamber 4a is being fired. In this position the inter-communication between the transfer ducts 26 and 27 has just been cut off by the arcuate slot in the valve plate having been moved past the coincident inner ends 26a and 27a of these ducts. The suction chamber 4b of the compressor is open to the inlet duct 10 for the combustible mixture and contains the next charge of combustible mixture for compression when the compressor piston has moved past the suction duct 10 in its anti-clockwise rotation. At the same time the exhaust chamber 4c of the explosion rotor is open to the exhaust duct 4d for the discharge of the exhaust gases resulting from the previous explosion.

Figure 13:
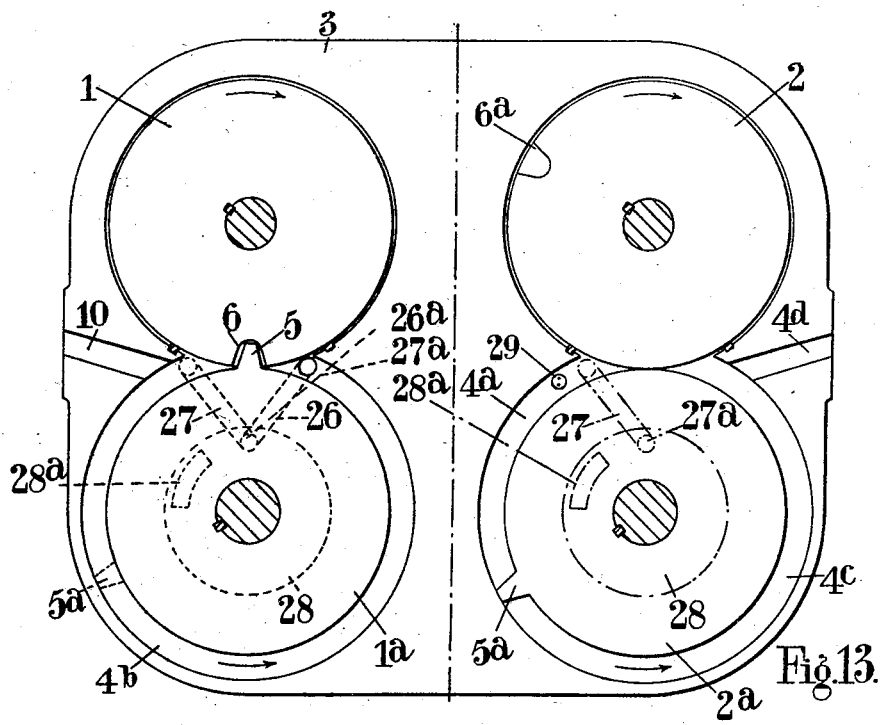

In Figure 13 the compressor piston is shown passing its top dead centre position in which the piston 5 is in engagement with the pocket 6 and the compression chamber 4 has momentarily disappeared and the suction chamber 4b has attained its maximum volume and is filled with a newly induced charge of combustible mixture. At the same time the exhaust gases from the previous explosion are being exhausted through the exhaust duct 4d.

Figure 14:
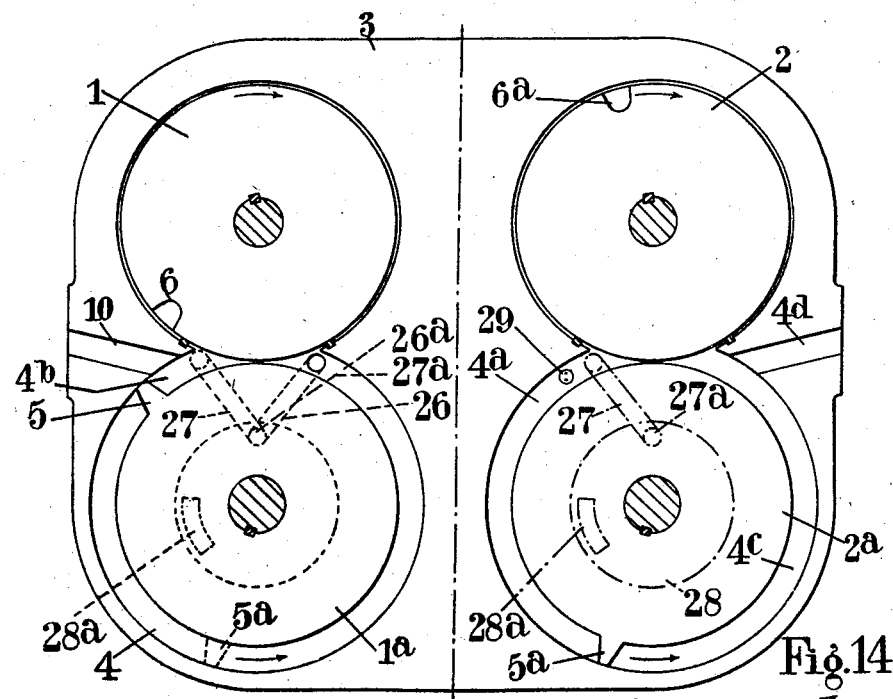

In Figure 14 the compressor piston 5 is shown as having passed by the suction duct 10 and the compressor piston 5 is now beginning to compress the combustible mixture in the re-formed compression chamber 4. At the same time a further charge of the combustible mixture is being drawn into the newly formed suction chamber 4b and the explosion piston 5a is still exhausting the explosion gases of the previous explosion through the exhaust duct 4d.

The ducts 26 and 27 still remain closed so that there is no inter-communication between them and the two sets of rotor chambers (i. e. the compression and suction and the explosion and exhaust) remain sealed off from one another.

Figure 15:
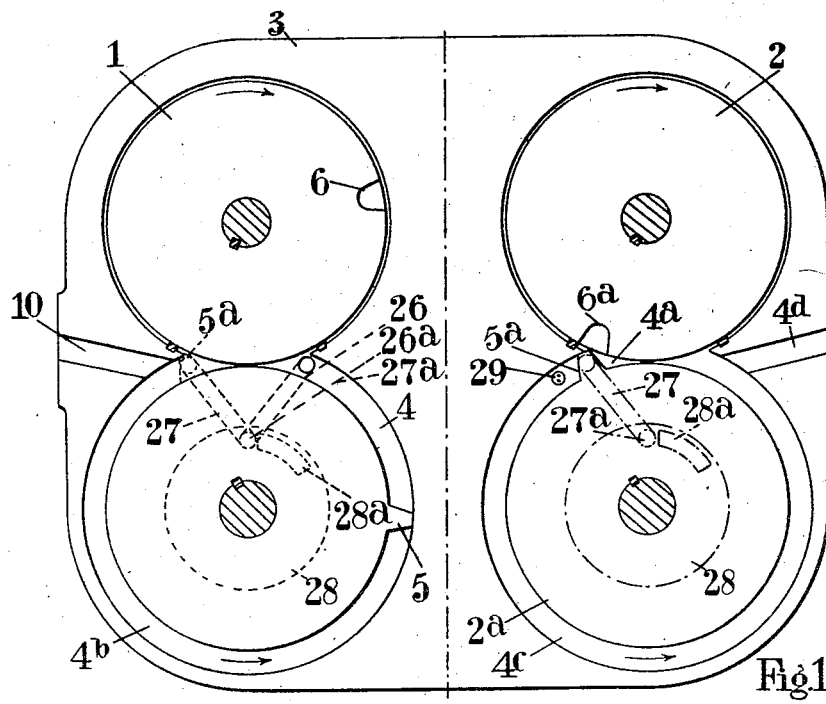

In Figure 15 the valve plate 18 is shown in the position in which its arcuate slot 28a is just about to open up communication between the two ducts 26 and 27 to allow the compressed charge of combustible mixture in the compression chamber 4 to pass into the newly forming explosion chamber 4a. In this position the piston 5a is just moving out of engagement with its pocket 6a in the companion abutment rotor 2, the exhaust gases of the previous explosion have been completely exhausted through the exhaust duct 4d and the exhaust chamber 4c is filled with the exhaust gases resulting from the explosion of the combustible mixture in the explosion chamber 4a as seen in Figure 12.

Figure 16:
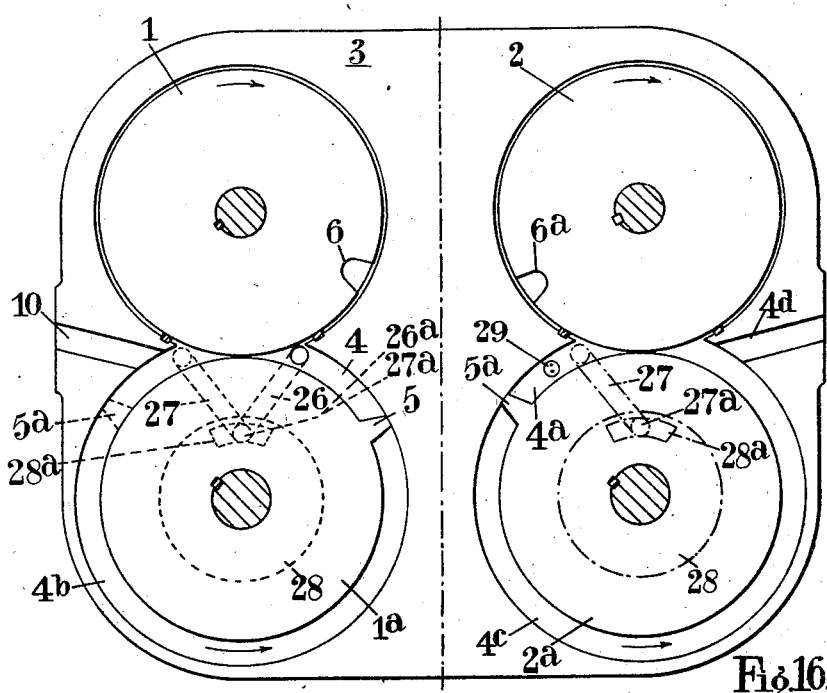

In Figure 16 the valve slot 28a is shown in the top dead centre position in which the ducts 26 and 27 are fully open to one another and a free flow of the compressed gases is possible from the newly formed compression chamber 4 into the newly formed explosion chamber 4a. At this time the piston 5a of the explosion rotor is commencing to exhaust the gases of the previous explosion.

In an analysis of the ideal cycle it may be assumed that the valve slot 28a closes the ducts 26 and 27 to each other when the power stroke starts, and that it opens when the compression stroke ends. In actual practice however the valve may close about 10° earlier and open about 10° later than this and this practice may be found to offer definite advantages under certain conditions as it permits the use of longer valve openings (that is, longer slots 28a) without unduly reducing the length of the available expansion stroke. At the same time it decreases the clearance space in the compression chamber. As low expansion rate and large clearance volume are the two principal reasons for the reduction in output and efficiency this deviation from the ideal process tends to increase the thermal efficiency as against that of the ideal theoretical cycle.

The volumetric efficiency, that is the ratio of the volume of gaseous mixture induced to the total displacement during the suction stroke, is determined to a great extent by circumstances outside the engine. Here the present engine offers a definite advantage over the standard "Otto" engine owing to the lower temperature of its compression chamber than that of the cylinder of the latter, and also because in the present engine the mixing with hot clearance gases takes place only after the suction stroke has been completed while in the "Otto" engine it takes place during the suction stroke.

Although each piston rotor is shown in the specific example illustrated in the drawings as provided with only a single piston, it is possible to modify the arrangement and modus operandi and to provide the piston rotors with more than one piston set at angularly spaced intervals around the piston rotors.

In the operation of the engine the operating parts are effectively sealed by the combination of sealing members and circulation of pressure oil above described and this oil, besides serving effectively to provide efficient lubrication, also provides a desirable cooling effect which extends to the portion of the engine where the same is particularly desirable, namely, to the piston of the firing or explosion chamber, since this piston by its arrangement of sealing elements and clearance passages, as exemplified in Figure 4, receives a continuous circulation of oil which serves to dissipate the heat of the piston created during the firing of the explosive charges. The pressure oil also constitutes in itself a sealing medium.

As above stated the clearances between the sealing elements 23 on each piston and the recesses in the latter in which these sealing elements are located are taken up by the pressure oil and at elevated speeds of rotation the sealing elements also assume an outwardly projected position due to centrifugal action. When the pistons enter their respective recesses in their companion rotors the outward projection of the sealing elements is a maximum, the outward projection thereof being restrained during the remainder of the rotary movement due to the contact of the sealing elements with the peripheral surfaces of the annular chambers in which the piston rotors operate. It is necessary therefore to accommodate for this condition and prevent the fully projected sealing elements from fouling the corner 30 of the waist portions of the engine casing and the projected sealing elements are brought opposite these corners. To this end the peripheral wall 31 of each said annular chamber is provided with a certain amount of eccentricity at the corners 30 sufficient to permit the fully projected sealing elements to move freely past these corners and be brought smoothly into engagement with the circular portion of the annular wall 31.

Whereas this eccentricity is certainly necessary to prevent the pistons from jamming at the corners 30 where the pistons enter their annular chambers there may be no real need to provide any eccentricity on the leaving side, that is at the opposite corners, and a lengthening of the stroke is thus possible.

When applied to a rotary pump the construction qua the sealing rings and liquid (oil) pressure sealing thereof and the pocket formation of the abutment rotor is similar to that above described but in this case only a single stage may be required, that is, a single pair of co-operating rotors and, of course, no distributing plate will be necessary.

Also when applied to the provision of a rotary steam engine the latter may comprise a pair of co-operating rotors consisting of a piston rotor and an abutment rotor generally constructed and arranged to operate in the manner above described and provided also with a pocket formation and sealing ring and liquid pressure system according to the above description. In this case the rotary steam engine may consist of adjacent pairs of co-operating rotors serving to form a compound engine and a manually or otherwise operable distributing plate valve may be provided between the two cylinder spaces afforded by the annular chambers surrounding the piston rotors which can be actuated to deliver the steam alternately to the first or high pressure cylinder and to the low pressure cylinder.

I claim:

A rotary engine of the kind specified comprising two cooperating pairs of peripherally engaging rotors arranged side by side on common parallel driving and driven shafts, a casing enclosing said rotors, said rotors constituting, on one side, a compressor for the combustible mixture, and on the other side, an explosion chamber, a partition wall in the casing separating the two rotor pairs and having transfer ducts therein respectively open to the annular chamber of the compressor rotor and to the annular chamber of the firing rotor, and a rotary member on the driving shaft rotatable in said partition and having an arcuate slot arranged, during a portion of the rotary motion thereof, to coincide with the entire inner ends of the two ducts whereby expansive mixture compressed by the compressor rotor is admitted to the firing chamber of the firing rotor.

JOHN FARESO.

REFERENCES CITED

The following references are of record in the file of this patent:

UNITED STATES PATENTS

| Number | Name | Date |
| --- | --- | --- |
| 308,598 | Dow | Dec. 2, 1884 |
| 619,004 | Tygard | Feb. 7, 1899 |
| 633,570 | Cornish | Sept. 26, 1899 |
| 686,394 | Deiwiks | Nov. 12, 1901 |
| 873,596 | Pingret | Dec. 10, 1907 |
| 1,001,677 | Ostergren | Aug. 29, 1911 |
| 1,012,850 | Herrick | Dec. 26, 1911 |
| 1,118,861 | Huck | Nov. 24, 1914 |
| 1,282,518 | Althause | Oct. 22, 1918 |
| 2,273,625 | Concannon | Feb. 17, 1942 |

FOREIGN PATENTS

| Number | Country | Date |
| --- | --- | --- |
| 2,772 | Great Britain | Feb. 2, 1912 |
| 151,448 | Great Britain | Sept. 30, 1920 |